(12) United States Patent
Eason

(10) Patent No.: US 10,858,139 B2
(45) Date of Patent: Dec. 8, 2020

(54) MY EASY SLIDING UTILITY BUCKET

(71) Applicant: Terry Eugene Eason, Long Beach, CA (US)

(72) Inventor: Terry Eugene Eason, Long Beach, CA (US)

( * ) Notice: Subject to any disclaimer, the term of this patent is extended or adjusted under 35 U.S.C. 154(b) by 0 days.

(21) Appl. No.: 16/185,218

(22) Filed: Nov. 9, 2018

(65) Prior Publication Data
US 2019/0276178 A1 Sep. 12, 2019

Related U.S. Application Data

(60) Provisional application No. 62/583,992, filed on Nov. 9, 2017.

(51) Int. Cl.
| | |
|---|---|
| *B65D 1/40* | (2006.01) |
| *B65D 25/20* | (2006.01) |
| *B65D 25/32* | (2006.01) |
| *B65D 1/16* | (2006.01) |
| *B65D 25/28* | (2006.01) |
| *A47J 47/18* | (2006.01) |

(52) U.S. Cl.
CPC ............... *B65D 1/40* (2013.01); *A47J 47/18* (2013.01); *B65D 1/16* (2013.01); *B65D 25/20* (2013.01); *B65D 25/2852* (2013.01); *B65D 25/32* (2013.01)

(58) Field of Classification Search
CPC ..................................... B65D 1/42; B65D 1/44

USPC ....... 220/605, 606, 607, 623, 628, 631, 608, 220/609, 635, 636, 632
See application file for complete search history.

(56) References Cited

U.S. PATENT DOCUMENTS

| | | | | |
|---|---|---|---|---|
| 3,176,873 | A * | 4/1965 | Montgomery | A01D 46/22 220/765 |
| 4,295,680 | A * | 10/1981 | Grasso | A01K 97/22 190/11 |
| 6,047,847 | A * | 4/2000 | Scott | B65D 21/0233 215/373 |
| 6,920,998 | B2 * | 7/2005 | Diamond | B65D 1/16 206/508 |
| D694,978 | S * | 12/2013 | Libman | D32/53 |

* cited by examiner

Primary Examiner — Jeffrey R Allen
(74) Attorney, Agent, or Firm — Terry Eason

(57) ABSTRACT

A bucket that provides a way to easily pull or push, by having less friction and resistance. The bucket has an approximately two inch round high center bottom that helps minimize contact with a surface. As the bucket becomes heavier with water, the bucket becomes more stable by nesting on the raised center diamond shape and onto a circular, quartered gaped, rounded top, inside ridge. The bucket acquires maximum stability and max friction when heaviest by nesting onto the quartered gaped rounded top outside ridge which slopes down to the buckets bottom edge of the outside wall. The rounded top bottom channels allow surface material to move through the gaps, but also will not allow water to collect on the bottom. The bucket has handles and hooking holes for the easy pushing and pulling over surfaces when heavy.

1 Claim, 3 Drawing Sheets

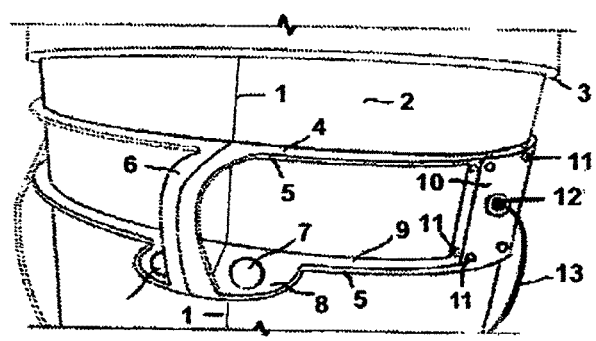
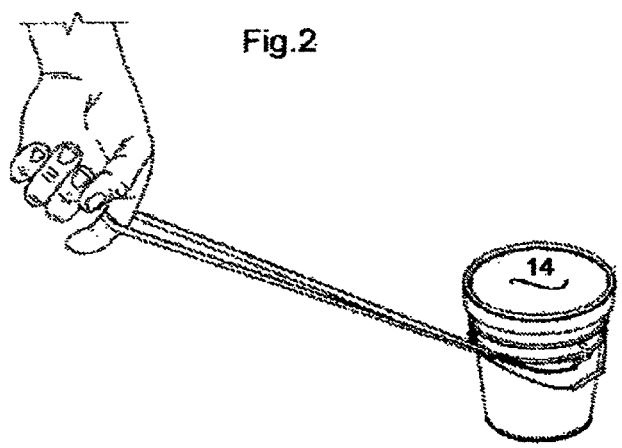

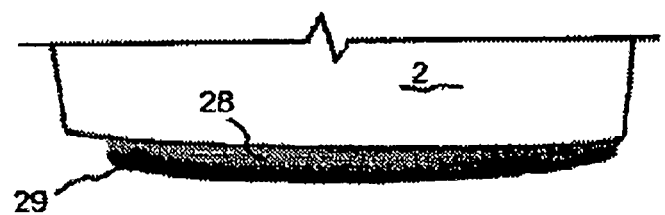
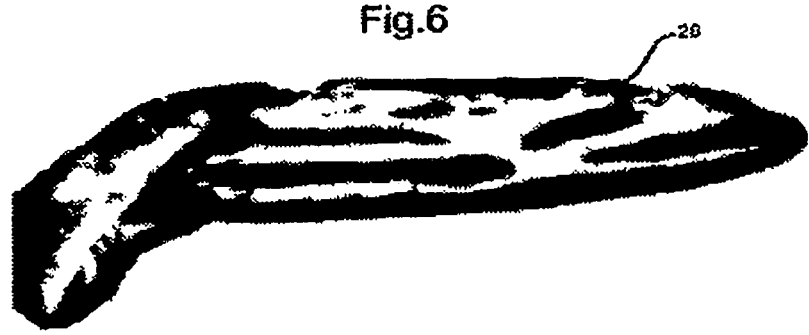

MY EASY SLIDING UTILITY BUCKET

BACKGROUND OF INVENTION

The present invention relates to a new single piece plastic, or a combination of composites, injection molded, sliding utility bucket with side finger handles and holes for hooking to pull buckets. The bucket has a rounded high centered bottom that slides easily over many surfaces when pulled. This bucket can be used by hobbyists or at job sites where a utility bucket may be needed. Uses may include fishing, gardening, cleaning, storing or hydroponics where this bucket will make the job faster, easier and safer. The present plastic buckets have a flat bottom with a raised outside bottom lip edge that makes moving a bucket a hazard. Heavy buckets can be awkward to carry often injuring the neck, arms or joints, but most often my lower back.

DESCRIPTION OF RELATED ART

Open-ended containers with a flat bottom have been in use since medieval times. The word bucket appeared around the thirteenth century. Plastic buckets started appearing in 1967 and the plastic top didn't appear til four years later. Since then, there's been different design changes to the plastic bucket ",", with the handle ",", the size, the outer support rings and the wire, plastic, rope or other handles and with to the handle connection boxes. The O'Leary patent 985-6052 with Bucket Innovations is for a handle molded into the bucket side near the bottom ",", for grabbing and turning bucket over. With the sliding bucket you tip bucket slightly and grab behind a bottom ridge to pour bucket contents. There are many patents for a double bucket, meaning two compartments. Some are square as in Casteel D 654,012 or design shapes as with Libman U.S. Pat. No. D694,978 S with two round buckets that are used for mopping floors and cleaning. These buckets use doilies with a different number of wheels as and Thibault U.S. Pat. No. 8,376,376 uses any bucket with a wheeled platform that has several compartments around the bucket and has a bungee cord attachment to the base. The bungee cord connects to a hole drilled into the top of the bucket so the worker can pick up the whole bucket assembly by the bucket handle. This is hard on the body and is why I created my safer sliding utility bucket. Hurtt, U.S. Pat. No. D654,239 which has wheels and a handle that extends up like a carry on suitcase with wheels will also carry any bucket in their platform wheeled dolly. While dollies have a use, you would not want to use them in a small grow room environment. The wheels get dirty and need cleaning which require you to purchase more dollies to use while cleaning, at a high cost between $20 and $150 each ",", and you will need more space to store cleaned dollies. Dollies also use more grow room space in height and width. Buckets are also used as bait buckets like Pfister U.S. Pat. No. 6,953,128 B2 MULTI-USE BUCKET shows a 5 gal. bucket divided into sections for growing seeds or separating objects. U.S. Pat. No. 4,295,680 by Grasso is a fishing seat that will fit on top of any bucket, even mine. The sliding bucket too ",", can be used as a seat or a fishing bucket. Here's a bucket called the Stacker by Dancyger U.S. Pat. No. 5,890,614 which has removable divided compartments stacked atop each other about four levels deep. Not any of these bucket patents make it easy or safer to carry a heavy bucket. Thibault wants you to pick a bucket up while attached to his wheeled platform with compartment while loaded ",", and can be very hazardous to your health. It is very awkward to carry a heavy bucket. The new easy sliding utility bucket slides easily over carpet and other surfaces when heavy ".".

BRIEF DESCRIPTION OF DRAWINGS

FIG. 1, is atop and bottom cut view of one side of a bucket, showing a circular outside wall with a wire carrying handle attached to a wire handle connection box, and at least one molded finger handle #6 with the top end molded to the outside wall supporting ring, lip edge, and the bottom end of said finger handle #6 is molded to the second supporting ring, extended lip edge, where said supporting ring lip edge flairs out to accommodate at least a hooking hole #7, on each side of an outside wall finger handle #6.

FIG. 2, shows a hand pulling a bucket with a lanyard ",", by a finger ",", and is attached with a hook to a hole near the bucket finger handle.

FIG. 5, shows how the bucket bottom sits on a surface with the bucket rounded bottom edge lifted up about an inch from the surface.

FIG. 6, shows a bucket bottom if detached and held in my hand and ",", as is ",", could fit on the bottom of old used buckets.

DETAILED DESCRIPTION OF DRAWINGS

FIG. 1, is a top and bottom cut view of the outer bucket wall showing details of a bucket on one of two sides. #1 shows a bucket molding seam line. #2 is the outside circular wall of a bucket. #3 is the bottom edge of a bucket lid if needed and is removable. #4 is the top of an outer wall support ring that protrudes out and supports bucket wall. #5 shows a thickness of the outside wall supporting rings #6 is a bowed out small finger handle, attached to each support ring that protrudes out from the outside wall. #7 is a hooking hole, on each side of the finger handles. #8 is a bottom support ring extension, for the hooking holes and is where the finger handle bottom connects to the bottom support ring. #9 is the flat top of the bottom outside wall support ring, that protrudes out and supports bucket wall and flairs out to accommodate the hooking holes and also expands the finger handle loop, from the outside wall. #10 is a wire handle connection box that protrudes from the outside wall, and is molded between the outside wall supporting rings, with the connection box having a closed top which is the upper bucket supporting ring and has an opened bottom which gaps the lower bucket supporting ring and has a slightly off center hole #12 where the wire handle #13 is connected.

FIG. 2, is a bucket #14 being pulled by a finger when heavy with water, by using a lanyard attached to a hooking hole #7 next to a finger handle #6.

Figure 3:
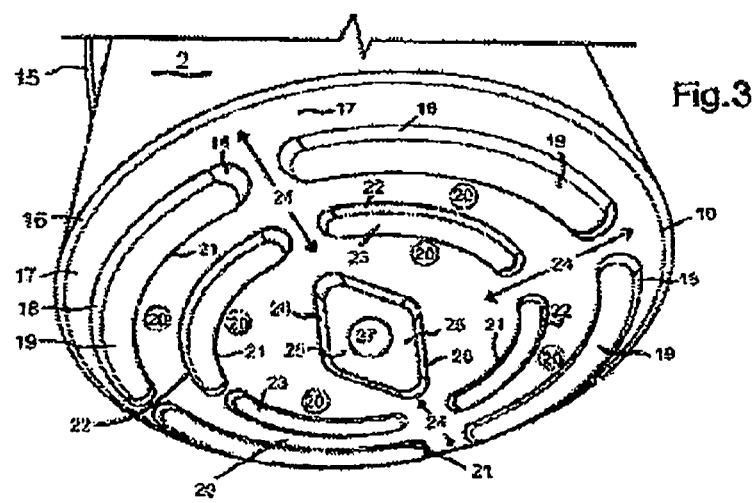
FIG. 3, shows a high center raised diamond shape #27 and the eight front sloped, rounded top ridges #23 with gaps #24 that create flow channels #24.

FIG. 3, is a top cut bottom angle view showing a bucket bottom with #2 being the bucket outside circular wall. #15 shows a piece of a bucket wire handle hanging down on the back side of a bucket. #16 shows how the bucket outside wall bottom edge becomes a part of the new bottom as the lowest point on the bucket bottom, and runs across #17 that slightly ascends to, #18 where the slightly rounded face flows up to the outside ridge tops #19. All the ridge tops are slightly rounded to facilitate sliding bucket #2. #21 is the back of all eight ridges and have a very sharp down curve from the tops and goes straight down back side #21 of all ridges and can be used as grips, to grab the bottom if needed. #20 which is a space between all ridges #19 and #23 that is elevated higher than the valleys #24 to help water flow to the valleys and off the bucket bottom. #26 is a slight rise at the very edge of #25 that is an ascending space leading up to the a high center two inch round flat #27 which will keep the bucket bottom edge up off a surface when heavy. #27 is a rounded top of the center diamond and the highest and the thickest point on the bottom that makes contact with a surface first.

Figure 4:
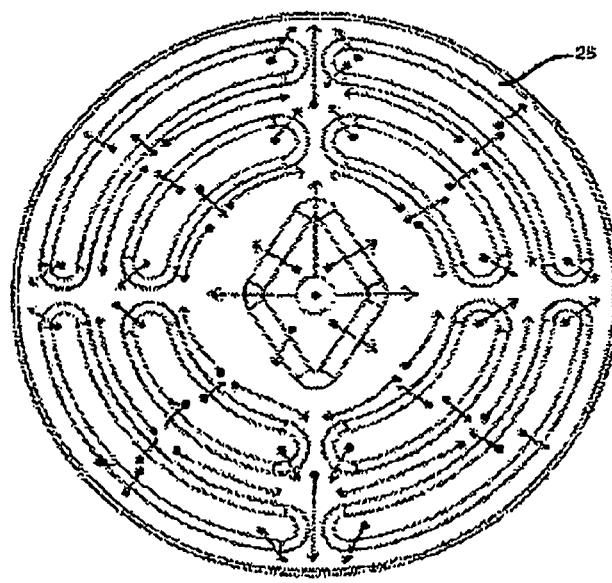
FIG. 4, shows by arrow direction, the flow of water off the bottom of the bucket.

FIG. 4, #28 is showing with directional arrows how water would run off and not collect on the bucket bottom.

FIG. 5, shows #2 as the outside circular wall and, the bottom #28 shows how the bottom edge rides about above a surface #29.

FIG. 6, shows the bucket bottom and how it looks being held in a hand.

What is claimed is:

1. A bucket comprising:
   a bucket bottom and a side wall extending upwardly from the bucket bottom;
   the bucket bottom comprising: a center point, wherein the center point is located in the center of the bucket bottom, is flat and has a diamond shape, wherein the center point is the highest point on the bucket bottom with respect to the sidewall;
   the bucket bottom further comprising a plurality ridges concentrically disposed around the center point, the plurality of ridges comprising a first set of ridges having a first height that is less than the height of the center point, and a second set of ridges having a height that is less than the height of the first ridge, and wherein the second set of ridges concentrically surround the first set of ridges;
   each of the first set of ridges comprising a plurality of ridges with rounded edges such that channels are formed between adjacent ridges of the first set of ridges;
   each of the second set of ridges comprising a plurality of ridges with rounded edges such that channels are formed between adjacent ridges of the second set of ridges;
   wherein the channels formed by the first and second set of ridges are aligned with diamond shape of the center point;
   wherein the bucket bottom is arranged such that bucket can slide on the bucket bottom when the bucket is pulled by a user and the bucket can rest on the bucket bottom when not being pulled.

* * * * *